United States Patent
Aljadeff et al.

(10) Patent No.: US 8,576,829 B2
(45) Date of Patent: Nov. 5, 2013

(54) MULTI-CHANNEL TDOA SYSTEM

(75) Inventors: Daniel Aljadeff, Kiriat Ono (IL); Reuven Amsalem, Nes-Ziona (IL); Amir Lavi, Rehovot (IL)

(73) Assignee: Aeroscout, Ltd. (IL)

( * ) Notice: Subject to any disclaimer, the term of this patent is extended or adjusted under 35 U.S.C. 154(b) by 1234 days.

(21) Appl. No.: 11/835,553

(22) Filed: Aug. 8, 2007

(65) Prior Publication Data

US 2008/0037512 A1   Feb. 14, 2008

Related U.S. Application Data

(60) Provisional application No. 60/821,788, filed on Aug. 8, 2006.

(51) Int. Cl.
    *H04J 3/06* (2006.01)

(52) U.S. Cl.
    USPC ......................................... 370/350; 455/404.2

(58) Field of Classification Search
    USPC ......... 370/252, 328, 335–336, 338, 345, 350, 370/503, 508–510, 512; 455/404.2, 414.2, 455/456.1, 457, 502; 342/442, 450, 457
    See application file for complete search history.

(56) References Cited

U.S. PATENT DOCUMENTS

| | | | | |
|---|---|---|---|---|
| 4,736,371 A | * | 4/1988 | Tejima et al. | 370/236 |
| 5,450,369 A | * | 9/1995 | Mastin et al. | 367/21 |
| 6,429,815 B1 | * | 8/2002 | Soliman | 342/357.15 |
| 6,654,701 B2 | * | 11/2003 | Hatley | 702/122 |
| 6,778,551 B1 | * | 8/2004 | Oh | 370/445 |
| 7,006,517 B1 | * | 2/2006 | Ben Michael et al. | 370/445 |
| 7,167,712 B2 | * | 1/2007 | Ogino et al. | 455/456.1 |
| 7,239,650 B2 | * | 7/2007 | Rakib et al. | 370/480 |
| 7,333,478 B2 | * | 2/2008 | Wiebe | 370/352 |
| 7,349,339 B2 | * | 3/2008 | Meckelburg et al. | 370/235 |
| 7,408,907 B2 | * | 8/2008 | Diener | 370/338 |
| 7,680,063 B2 | * | 3/2010 | Bedekar et al. | 370/252 |
| 7,688,747 B2 | * | 3/2010 | Zumsteg | 370/252 |
| 7,693,127 B2 | * | 4/2010 | Nonoyama | 370/347 |
| 7,738,413 B2 | * | 6/2010 | Varaiya et al. | 370/321 |
| 7,920,597 B2 | * | 4/2011 | Conway et al. | 370/503 |
| 8,274,958 B2 | * | 9/2012 | Huber et al. | 370/338 |
| 2002/0086640 A1 | * | 7/2002 | Belcher et al. | 455/63 |
| 2004/0012524 A1 | * | 1/2004 | Couronne et al. | 342/387 |
| 2004/0063401 A1 | * | 4/2004 | Meckelburg et al. | 455/41.1 |
| 2004/0072582 A1 | * | 4/2004 | Aljadeff et al. | 455/456.1 |
| 2004/0108954 A1 | * | 6/2004 | Richley et al. | 342/387 |
| 2004/0202198 A1 | * | 10/2004 | Walker et al. | 370/474 |
| 2005/0053119 A1 | * | 3/2005 | Day | 375/130 |
| 2005/0122231 A1 | * | 6/2005 | Varaiya et al. | 340/870.01 |
| 2005/0169233 A1 | * | 8/2005 | Kandala et al. | 370/349 |
| 2005/0195770 A1 | * | 9/2005 | Baliga et al. | 370/335 |
| 2006/0055552 A1 | * | 3/2006 | Chung et al. | 340/686.1 |
| 2006/0075131 A1 | * | 4/2006 | Douglas et al. | 709/230 |
| 2006/0159003 A1 | * | 7/2006 | Nanda et al. | 370/203 |
| 2009/0280836 A1 | * | 11/2009 | Chou | 455/456.5 |

* cited by examiner

*Primary Examiner* — Kevin Mew
(74) *Attorney, Agent, or Firm* — Finnegan, Henderson, Farabow, Garrett & Dunner, L.L.P.

(57) ABSTRACT

A wireless network has at least one wireless unit which transmits messages in multiple channels. The messages are synchronously transmitted using a transmit clock signal. The at least one wireless unit starting transmission of the messages at intervals consisting of at least one of one or multiple periods of the transmit clock signal. A plurality of location receivers are used for receiving the messages at different channels transmitted by the wireless units within the wireless network and determining a time of arrival for the received messages. At least one master unit is used for receiving the time of arrival from each of the location units. The location of the wireless unit is to be determined on the Time Difference Of Arrival (TDOA) of the transmitted messages at the location units.

35 Claims, 3 Drawing Sheets

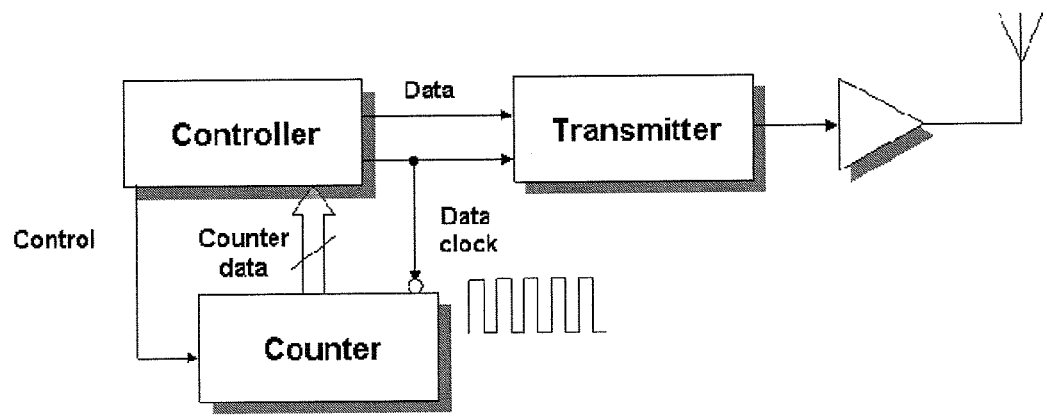
Figure 1: Transmitter section
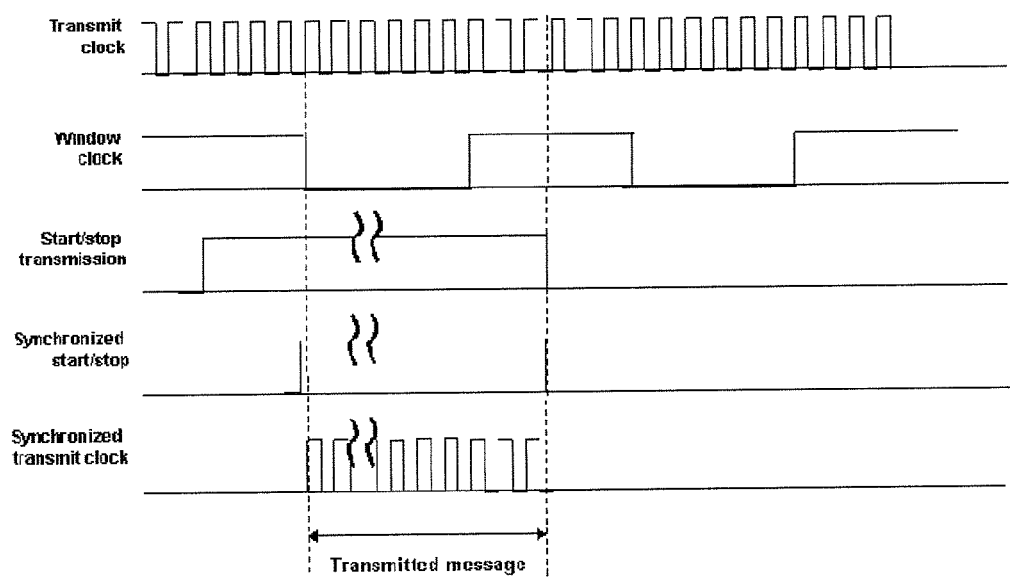
Figure 2: Message transmission timing

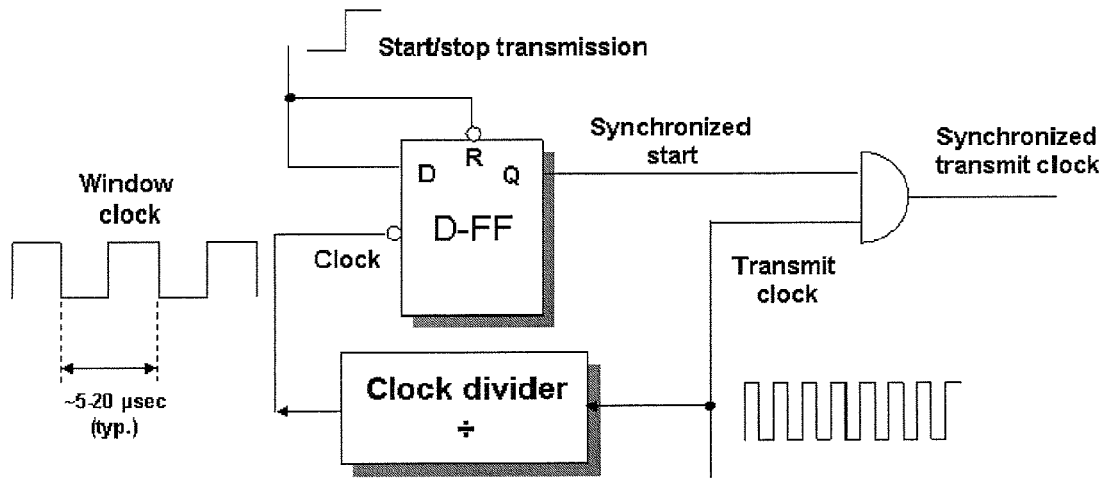
Figure 3: Timing circuit
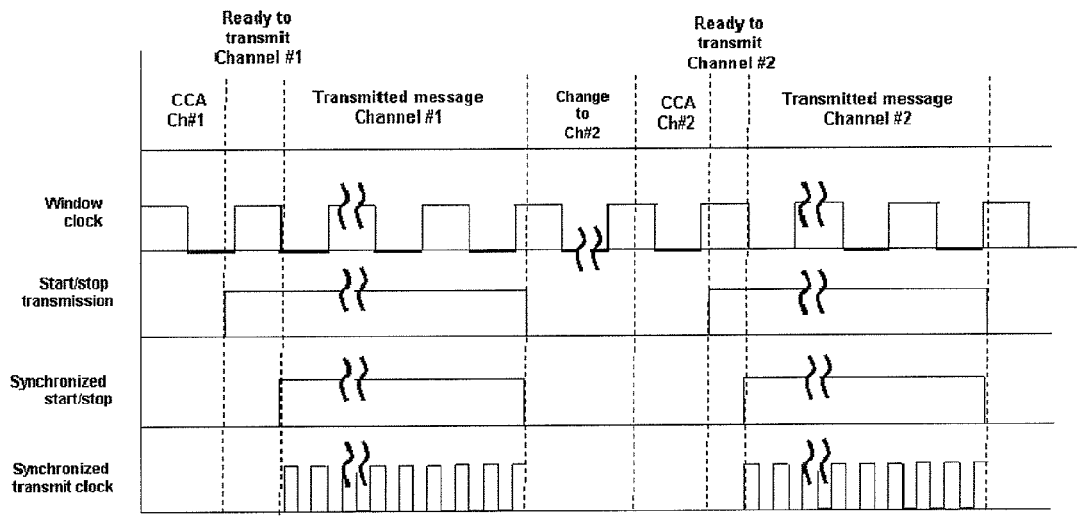
Figure 4: Multiple message transmission timing

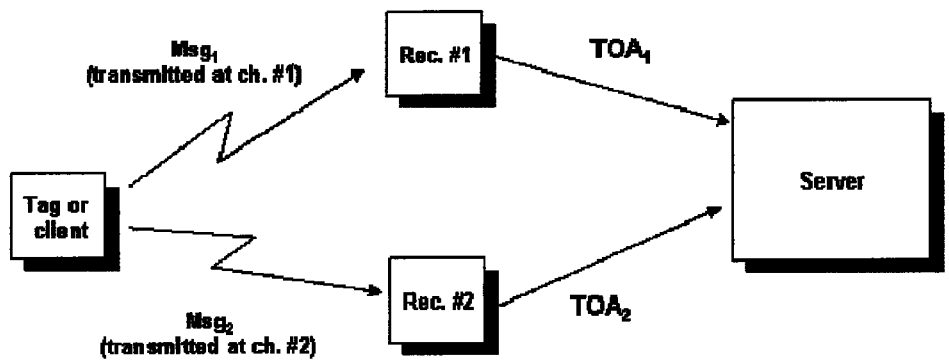
Figure 5: Basic system
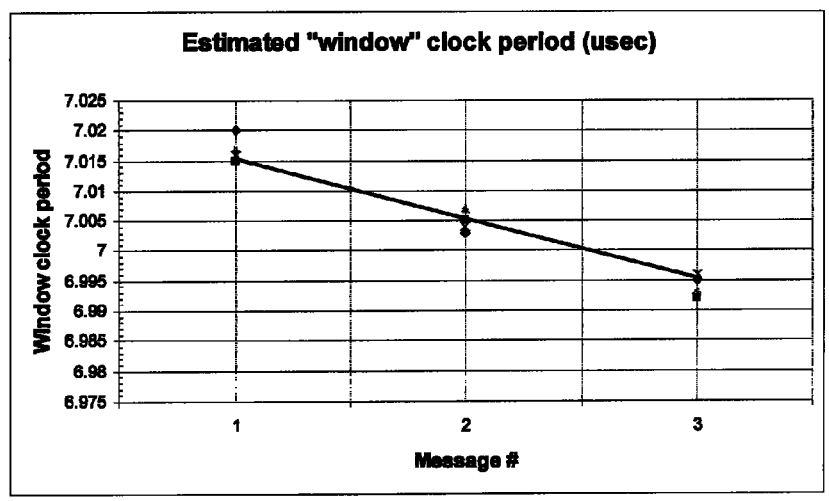
Figure 6: Clock period estimate

MULTI-CHANNEL TDOA SYSTEM

RELATED PATENT APPLICATIONS

This application is related to U.S. Provisional Application Ser. No. 60/821,788, filed Aug. 8, 2006, in the name of the same inventor listed above, and entitled, "MULTI-CHANNEL TDOA SYSTEM". The present patent application claims the benefit under 35 U.S.C. §119(e). The present application is further related to previously filed U.S. patent Application entitled, "METHOD AND SYSTEM FOR LOCATION FINDING IN A WIRELESS LOCAL AREA NETWORK" having a Ser. No. 10/225,267 and previously filed U.S. Patent Application entitled "WIRELESS LOCAL AREA NETWORK (WLAN) CHANNEL RADIO-FREQUENCY IDENTIFICATION (RFID) TAG SYSTEM AND METHOD THEREFOR" having a Ser. No. 10/274,698, the specifications of which is herein incorporated by reference.

FIELD OF INVENTION

The present invention relates to Time Difference of Arrival (TDOA) systems, and more specifically, to a method of transmitting synchronized messages in a multiple channel network, in which TDOA location needs to be done from messages transmitted at different channels.

BACKGROUND OF THE INVENTION

In many WLAN and other wireless data networks implementations, it is beneficial for the system owner to know the physical location of mobile clients or compatible tags. This will enable new features such as enhanced network security, providing of 'location based' services, asset tracking and many others The patent applications mentioned above, describe the basic techniques for performing 'location' of a standard client or 'stand alone' tag. A typical 'location finding' system, as currently implemented by the assignee and disclosed in the related patent applications, consists of multiple 'location receivers' connected to the WLAN system, either by means of CAT-5 backbone or by wireless bridges. The typical 'location receiver' contains a WLAN receiver and the circuitry required to extract Time of Arrival (TOA) information and report this information to the system's location server. The 'location server' performs the required computation of the client location based on the known location of the location receivers, and displays it to the user or reports it to the requesting application.

In a TDOA based location system, the TDOA of each pair of location receivers is calculated from the reported TOA's that were calculated on a single transmitted message. For this reason, all those location receivers reporting a single transmitted message are all tuned to the same channel.

In a wireless local area data communication system, said Location Receivers may be attached and/or integrated and/or be a part of the Access Points in said wireless network. Further elaboration of these systems and methods can be found in the above mentioned patent application.

In some location systems it is desirable to have the location receivers or Access Points (AP) able to measure TOA of a received message, working in different channels. In such a system, a tag or standard client is required to transmit several messages at different channels to allow all those location receivers or AP's to receive and measure the TOA of the transmitted messages. Since the transmission of those consecutive messages is not synchronized, it's not possible to calculate the TDOA from the reported TOA of two receivers at different channels. In those cases, TDOA is calculated between receivers tuned to the same channel (reporting the TOA of a single message).

Normally the transmission of those messages by a standard client or a tag depends on clear channel assessment (CCA) and for that reason accurate transmission time cannot be ensured. Moreover, the transmission of messages is initiated by a processor which cannot ensure accurate start of transmission.

To perform an accurate TDOA location, it's needed to have a timing uncertainty between transmitted messages of no more than few nsec. Current transmitter units cannot achieve such accurate transmission timing and still be compliant with other network transmission requirements.

Therefore, a need existed to provide a device and method that overcomes the above problems.

SUMMARY OF THE INVENTION

In accordance with one embodiment of the present invention, a wireless network is disclosed. The wireless network has at least one wireless unit which transmits messages in multiple channels. The messages are synchronously transmitted using a transmit clock signal. The at least one wireless unit starting transmission of the signals at intervals consisting of at least one of one or multiple periods of the transmit clock signal. A plurality of location units are used for receiving the messages transmitted by the wireless units within the wireless network and determining a time of arrival for the received messages. At least one master unit is used for receiving the time of arrival from each of the location units. The location of the wireless unit is to be determined on the Time Difference Of Arrival (TDOA) of the transmitted messages at the location units.

In accordance with another embodiment of the present invention, a method for accurately measuring the TDOA of messages transmitted at different channels in a multiple-channel wireless data communication system is disclosed. The method comprises: transmitting the messages in multiple channels by at least one wireless unit, wherein the messages are synchronized using a transmit clock signal, transmission of the messages at intervals consisting of at least one of one or multiple periods of the transmit clock signal; receiving the messages transmitted by the wireless units device by a plurality of location receivers within the wireless network; determining a time of arrival data for the received signals by the plurality of location receivers; and receiving time of arrival data by at least one master unit; and determining location of the wireless unit by the Time Difference Of Arrival (TDOA) of the transmitted signals.

The present invention is best understood by reference to the following detailed description when read in conjunction with the accompanying drawings.

BRIEF DESCRIPTION OF THE DRAWINGS

FIG. 1 shows simplified block diagram of one embodiment of a transmitter section used in the present invention.

FIG. 2 shows the basic timing of a message transmission according to the embodiment depicted in FIG. 1.

FIG. 3 shows a simplified block diagram of a timing circuit used in the present invention.

FIG. 4 shows a timing diagram for sending multiple messages in accordance with the present invention.

FIG. 5 depicts a simplified block diagram of a basic system consisting of one tag or client, able to transmit messages at least on two different channels in accordance with the present invention.

FIG. 6 shows an estimated window clock period in accordance with the present invention.

DETAILED DESCRIPTION

The present invention describes a method and a location system performing multiple-channel TDOA (Time Difference Of Arrival) on synchronized messages in multiple channels being transmitted by a unit to be located by the Location System using said method. The present method can be implemented in tags as well as in any standard wireless client operating in such networks. For the sake of simplicity, any reference to tags in this document, applies also to wireless mobile units or standard clients and vice versa. In addition any reference in this document to a Location Receiver is fully applicable to an Access Point (AP) having the capability to measure the TOA (Time of Arrival) of a received message. In another embodiment, the Location Receiver may be attached and/or integrated and/or be a part of the Access Point.

In CDMA/CA networks, any unit willing to transmit a message shall sense the air to ensure there is no other transmission in the air (Clear Channel Assessment—CCA). The present invention describes a method of transmitting synchronized messages at different channels and still working according to the CCA rules. Moreover, it describes a method for minimizing TDOA errors when the TDOA is calculated on messages separated by short intervals (few msec). The transmitted messages may be the same in all channels or different (e.g. only one message may include telemetry information; each message may include specific information related to the channel, etc.).

Referring to FIG. 1, one embodiment of a transmitter unit 100 according to the present invention is shown. The transmitter unit 100 or communication controller 110 generates the data to be transmitted which is passed to the transmitter 120. The transmitter 120 modulates and transmits the data in a programmed channel. For the sake of simplicity other sections of a standard transmitter have been omitted form the figure.

In addition to the standard transmitter functions, the transmitter unit 100 consists of a counter 130 coupled to the communication controller 110. The counter 130 counts cycles of the data clock signal from the communication controller 110 used to transmit the data. In a preferred embodiment the clock is a chip clock while in another preferred embodiment it may be a bit clock.

The communication controller 110 clears and enables the counter 130 to start counting when the transmission of the first message starts. The communication controller 110 samples and reads the counter value when the transmission of the second message (at a different channel) starts, while the counter 130 continues counting clock cycles. This process is repeated as many times it's needed according to the number of synchronized messages transmitted.

Each message transmitted by the transmitter unit 100 includes a data field including the value of the counter at the beginning of the message. Therefore, in message #1 the value of the counter is zero and in the subsequent transmitted messages, the value of this counter reflects the interval time (in clock cycles) between the first message and the transmitted message.

In another embodiment of the present invention, the data field includes the difference between the values of the counter in the current and previous message (i.e. time elapsed between the current and previous message).

The embodiment according to FIG. 1 requires the transmitter unit 100 to transmit the number of clocks elapsed between two messages. In some cases, this may be difficult to do.

Referring to FIG. 2, a timing diagram 200 is shown in which the above problem does not exist. FIG. 2 shows the basic timing of a message transmission according to one embodiment of the present embodiment. The transmitter unit 100 of FIG. 1 will uses two clocks: a free running transmit clock (e.g. 11 MHz in an 802.11b WLAN unit) is the basic clock used to transmit the message; and a "window" clock derived and fully synchronized to the free running transmit clock. The rate of the window clock mainly depends on the maximum propagation time expected in a network.

For example, in accordance with one embodiment, the maximum propagation time in an 802.11b/g WLAN, is 2-5 μsec. To avoid ambiguities, the window clock period shall, be greater than twice the maximum propagation time and plus 0.5-1 μsec (to avoid errors due to tag clock drifts). Normally this clock is expected to have a period of approximately 5-20 μsec.

Following with above example, if the transmit clock is 11 MHz, and the maximum propagation time is 2.8 μsec (800-850 m), then the "window" clock may be selected as follows:

$$T_{wk} > 2*2.8 \text{ μsec} + 1 \text{ μsec}$$

$$T_{wk} > 6.6 \text{ μsec}$$

$$F_{wk} = 1/T_{wk} = \frac{11 \text{ MHz}}{11*7} \approx 0.142857 \text{ MHz}$$

$$T_{wk} = 7 \text{ μsec}$$

Where:
$F_{wk}$: Window clock frequency
$T_{wk}$: Window clock period.

Once the unit is ready to transmit a message (e.g. the backoff and CCA processes are completed), the transmitter unit 100 raises a "start/stop transmission" signal. This signal enables the process of a synchronized transmission. The real message transmission starts at the next (after the start/stop signal becomes active) trailing edge of the window clock, when the "synchronized start/stop" signal becomes active. Once the message is fully transmitted, the transmitter unit 100 drops the "start/stop transmission" signal and this stops immediately the "synchronized transmission clock". In a preferred embodiment the transmitter power amplifier control is connected to the "synchronized start/stop signal"

Referring to FIG. 3, a timing circuit 300 to be used with the transmitter unit 100 and implementing the above process is shown. The "window clock" 350 is generated from the transmit clock 340 using a clock divider 310 so both clocks are fully synchronized. The "window clock" 350 samples the "start/stop transmission" signal and once this signal is set, the Q-output of the D-FF 320 ("synchronized start" signal) will be set on the next trailing edge of the "window clock". This signal will open the gate 330 to the "transmit clock" 340 and the "synchronized transmit clock" 360 will become active. The "synchronized transmit clock" 360 is used to transmit the message.

Once the message is fully transmitted, the transmitter unit 100 drops the "start/stop signal" and then the "synchronized transmit clock" 360 stops immediately. Since the period of the window clock 350 is short (few μsec), the actual transmission of the message is started after a very short time delay after the Start/Stop transmission signal is active. Therefore there is an insignificant risk that another transmitter will occupy the clear channel because this additional delay.

The process explained above refers to the synchronized transmission of a single message. Referring to FIG. 4, FIG. 4 depicts how several messages (e.g. 2-4 messages), are synchronously transmitted at several channels. The free running transmit clock 340 (FIG. 3) and the "window clock", are fully synchronized and run continuously during the whole transmission period (all the messages transmitted at the different channels).

After the synchronized transmission of the first message at channel #1 is completed, the transmitter unit moves to the channel #2 and then performs a CCA process (also a short backoff process if required). Once channel #2 is clear to transmit, the transmitter unit starts a new synchronized transmission. Once this second transmission is completed, the unit moves to the third channel and so on. Note that the spacing between two transmitted messages (at two channels) is fully synchronized at exact intervals of the "window clock".

In another embodiment of the present invention, the messages are transmitted at fixed intervals (fix number of window clock periods). According to this embodiment, the CCA process is done on the first channel only.

In another embodiment of the present invention, the messages are transmitted by the tag, at a variable order of channels according to their busy status. If a channel is busy, the tag will select a new channel and come back later to this channel or skip the transmission in the busy channel if said channel is busy for a long period of time (longer than a specified limit).

In another embodiment of the present invention, the "window clock period" is programmable and its period transmitted by the tag as part of the message information.

In another embodiment of the present invention, the transmitted message includes information (e.g. channel # and timing) on the next channel to be used.

In some wireless networks it maybe desirable for the tag to transmit the synchronized messages according to an external event.

In a preferred embodiment of this invention, the tag transmits the messages as a response of an external request or event (wireless or wired signal). In another preferred embodiment, the transmission time will be within a time slot as specified by an Access Point or any other element coordinating the traffic in the network. Said Access Point or network coordinator may also specify the order of channels to be used by the tag.

Referring to FIG. 5, there is a very basic system 500 consisting of one tag or client 510, able to transmit messages at least on two different channels. In addition there are two receivers 520 able to receive, decode and measure the TOA of the messages transmitted by said tag or client 510. Note that the basic system 500 is just for the purpose of this explanation. Practical systems may obviously include many Location Receivers and/or Access Points and many tags.

The receivers 520 report the measured TOA to a server 530 able to compute the TDOA of those two measurements. For the sake of simplicity, let assume that those two receivers 520 are time synchronized (e.g. a simultaneous arrival of a signal at both receivers, will be reported with the same TOA value from both receivers). In actual systems, there are several techniques on how this time synchronization can be implemented. These techniques are well known to people skilled in the art.

The TDOA computed by a system using the TOA's measured from two different messages can be denoted as follows:

$$TDOA_{12} = TOA_1 - TOA_2$$

Where:
$TOA_1$: The Time of Arrival measured by Receiver #1 (@ channel #1) on Message #1.
$TOA_2$: The Time of Arrival measured by Receiver #2 (@ channel #2) on Message #2.
$TDOA_{12}$: The Time difference of arrival between those two TOA's.

Let assume that the tag or client 510 transmits message #1 at $T_1$ (per transmitter clock) and transmits message #2 at $T_1+N*T_{ck}$ (per transmitter clock). According to the embodiment described in FIG. 1, the number of clock cycles (N) elapsed between two messages is known to the server 530 (since this value is transmitted by the unit) as well as the transmitter clock (e.g. chip or bit clock). Therefore, the server 530 can easily calculate the true TDOA by subtracting this product term ($N*T_{ck}$).

Since the actual transmitter clock frequency of each transmitter unit is unknown to the server 530, the calculated TDOA will have an error. This error can be significantly reduced by doing an estimate of the actual clock frequency of the transmitter as will be explained below.

According to the embodiment described in FIG. 2, N is the number of "window" clock periods between two messages (Integer number unknown to the receivers) and $T_{ck}=T_{wk}$ which is the "Window" clock period.

As it was previously shown, the messages are transmitted with a time interval equal to an integer number of window clock periods. Let assume the propagation time of message #1 (from the transmitter to receiver #1) is $T_{P1}$ and the propagation time of message #2 (from the transmitter to receiver #2) is $T_{P2}$ Therefore one can write:

$$TDOA_{12}=TOA_1-TOA_2$$

$$TDOA_{12}=(T_1+T_{P1})-(T_1+N*T_{wk}+T_{P2})$$

Or, $$TDOA_{12}=(T_{P1}-T_{P2})+N*T_{wk}$$

Since the term $(T_{P1}-T_{P2})$ is always smaller than $0.5*T_{wk}$, the server can theoretically (if it knows the tag clock $T_{wk}$) subtract from $TDOA_{12}$ any required integer number of "window clock" periods until the following equation is true:

$$|TDOA_{12}|<0.5*T_{wk}$$

Therefore, the real TDOA after subtracting the required number of "window clock" periods will be:

$$TDOA_{12}=(T_{P1}-T_{P2})+N*T_{wk}-N*T_{wk}$$

$$TDOA_{12}=(T_{P1}-T_{P2})$$

The same process can be repeated for any number of channels.

To the skilled in the art, it will be clear, that in practical implementations, the exact period of the tag clock ($T_{ck}$ or $T_{wk}$) is unknown to the Location Receiver and to the server and therefore the term:

Note: For the sake of simplicity the following analysis is done on $T_{wk}$ but it also applies to $T_{ck}$.

$$N*T_{wk}-N*T^e_{wk} \neq 0$$

Where:

$T_{wk}$: Window clock period according to the transmitter clock
$T^e_{wk}$: Window clock period as estimated by the receiver clock
If the Location Receiver has no means to exactly estimate this clock, then the calculated TDOA by the server will have an error as follows:

$$TDOA_{12} = (T_{P1} - T_{P2}) + \epsilon$$

Where:

$\epsilon$: TDOA error caused by the difference between the tag actual clock period and the same clock as estimated by the server.

In practical systems, the tag clock has relatively low stability and may have a temperature drift of around ±25 ppm. Having this clock drift and when the interval between transmitted messages is few msec, the error $\epsilon$ can be greater than 50-70 nsec. Although this error is relatively small, it is very significant in location systems where an accuracy of few meters is required. Therefore, to achieve good accuracy, the LR needs to accurately estimate the tag clock for any message transmission.

In most of the low cost radio transmitters, there is a single clock oscillator which drives the digital section and the RF PLL that generates the transmit carrier frequency. Therefore, any frequency deviation in the clock of the tag directly affects the "window" clock period and the carrier RF frequency.

In a preferred embodiment, the Location Receiver has a more stable and accurate clock (compared to the tag). When a tag message is received by a Location Receiver, it may sample the I&Q (in-phase and quadrature) baseband signals and by estimating the frequency of those signals, the Location Receiver can easily estimate the difference between its carrier frequency and the tag carrier frequency.

To the skilled in the art, it's also obvious that having this information, the Location Receiver can accurately estimate the real period of the "window" clock (or the chip or bit clock in another preferred embodiment) of the tag and minimize the TDOA error. In a preferred embodiment, where the Location Receivers have a clock with an overall stability of 1 ppm, and the interval between transmitted messages is few msec, the TDOA error will be few nsec. In other preferred embodiments, the Location Receiver clock may be even more accurate and stable (e.g. 0.1-0.2 ppm) achieved by a better clock oscillator or by a centralized calibration function (e.g. a broadcast message generated from a transmitter with a very stable and accurate clock or from a GPS receiver). Initial offsets of the Location Receiver clock source can also be removed by performing a calibration (with a very accurate reference clock) during the manufacturing process.

In a preferred embodiment, using the above mentioned or any other prior art techniques, it is possible for the Location Receiver to estimate the frequency clock with an accuracy of 0.1-1.0 ppm.

Referring to FIG. 5, each Location Receiver 520 reports to the server 530 the estimated TOA of the received message and the estimated clock frequency of the tag 510. The server 530 calculates the TDOA between each pair of receivers 520 and uses the estimated clock frequency of the tag 510 to reduce the error caused by the clock drift.

In accordance with one embodiment, the server makes use of all the reported values of the clock frequency of the tag 510, to calculate a more accurate estimate of the tag clock. The server 530 processing may consist of simple averaging all estimated clock periods as well as more sophisticated functions including estimating the clock window clock period over time, outliers filtering, etc.

In accordance with another embodiment, a system consisting of several Location Receivers receiving at three different channels (few units on each channel). A tag transmits three messages at different intervals and each of the Location Receiver reports an estimated window clock period. Referring to FIG. 6, the server uses a linear fit (in this case it is assumed that the clock drift is linear in this short time period) to calculate the window clock period in the tag as function of time.

In some cases, the tag or mobile units have an oscillator that can be slightly tuned by the tag processor. In a preferred embodiment, the tag or mobile unit can tune and correct the drift of said oscillator based on a wireless signal received by the tag.

As can be easily understood from the above description, the same principles maybe applied in many other embodiments without limiting the scope of this invention.

The above system and method allows for simple implementation. The implementation of a tag according to this invention is very simple and cost effective. The requirements on the digital section are minimal and there are no special requirements for the RF section. The system and method can be fully adapted to comply with any CCA requirements. The system and method can be easily adapted to any kind of network having a TDOA system operating in multiple channels (e.g. WLAN, cellular, frequency hopping systems, etc.). The system and method enables a good TDOA accuracy, even using low cost oscillators in the mobile units or tags. In addition, in some cases, using multiple channels for TDOA is also beneficial for combating multipath since it creates frequency diversity.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A wireless network comprising:
   a wireless unit which synchronously transmits messages in multiple channels using a transmit clock signal, the wireless unit starting transmission of the messages at intervals comprising of at least one of one or more periods of the transmit clock signal so that transmission of two of the messages is separated by a time interval of one or more periods of the transmit clock signal, wherein the wireless unit does not transmit during the time interval;
   a plurality of location receivers for receiving the messages in one of at least two different channels, said messages transmitted by the wireless unit within the wireless network and determining a time of arrival for the received messages; and
   at least one master unit for receiving the time of arrival from each of the location receivers to determine a location of the wireless unit based on the Time Difference Of Arrival (TDOA) of the transmitted messages at the location receivers.

2. A wireless network in accordance with claim wherein the wireless unit comprises:
   a communication controller which generates data to be transmitted; and
   a transmitter coupled to the communication controller to modulate the data and transmit the messages in a programmed channel, the transmitter starting transmission of the messages at intervals consisting of at least one of one or multiple periods of the transmit clock signal.

3. A wireless network in accordance with claim 2 wherein the wireless unit further comprises;
a counter coupled to the communication controller to count cycles of the transmit clock signal; and
wherein the communication controller clears and enables the counter to start counting when transmission of a first message starts, the communication controller samples and reads a counter value when transmission of a second message on a different channel starts, the counter continuing counting clock cycles.

4. A wireless network in accordance with claim 2 further comprising a timing circuit coupled to the transmitter to provide synchronization of the transmit messages.

5. A wireless network in accordance with claim 4 wherein the timing circuit comprises:
a clock divider coupled to the transmit clock signal for generating a window clock signal, wherein the window clock signal and the transmit clock signal are synchronized; and
a flip-flop device coupled to the communication controller, the flip flop device receiving start and stop transmission signals and outputting the synchronized start transmission signal on an edge of the window clock.

6. A wireless network in accordance with claim 1 wherein the plurality of location receivers comprise a mechanism that estimates clock frequency of the wireless unit.

7. A wireless network in accordance with claim 1 wherein said transmitted messages by said wireless unit include information related to the interval between two or more transmitted messages.

8. A wireless network in accordance with claim 1 wherein said transmission intervals consist of one or more periods of a window clock, said window clock being derived from the transmit clock and synchronized to it.

9. A wireless network in accordance with claim 8 wherein said window clock period is programmable and said programmable period is transmitted as part of the message data.

10. A wireless network in accordance with claim 1 wherein said transmission intervals are fixed and wherein a Clear Channel Assessment (CCA) process is done on a first channel only.

11. A wireless network in accordance with claim 1 wherein said transmitted messages are transmitted in a variable order of channels.

12. A wireless network in accordance with claim 11 wherein said transmitted messages include information on a next channel to be used.

13. A wireless network in accordance with claim 1 wherein said transmitted messages are transmitted as a response to an external request or event.

14. A wireless network in accordance with claim 1 wherein said transmitted messages are transmitted within time slots as specified by a WLAN Access Point or any other element managing traffic in the wireless network.

15. A wireless network in accordance with claim 1 wherein at least one of the plurality of location receivers is part of a WLAN Access Point.

16. A wireless network in accordance with claim 1 wherein at least one of the plurality of location receivers reports an estimated clock frequency of said wireless unit to the master unit for use to improve the TDOA accuracy.

17. A wireless network in accordance with claim 1 wherein the wireless unit is a tag device.

18. A method for accurately measuring the Time Difference Of Arrival (TDOA) of messages transmitted at different channels in a multiple-channel wireless network comprising:
synchronously transmitting the messages in multiple channels using a transmit clock signal of a wireless unit, the transmitting of the messages occurring at intervals consisting of at least one of one or more periods of the transmit clock signal so that transmission of two of the messages is separated by a time interval of one or more periods of the transmit clock signal, wherein the wireless unit does not transmit during the time interval;
receiving the messages transmitted by the wireless unit by a plurality of location receivers within the wireless network on at least two different channels;
determining a time of arrival data for the received messages by the plurality of location receivers;
receiving time of arrival data by at least one master unit; and
determining a location of the wireless unit based on the Time Difference Of Arrival (TDOA) of the transmitted messages.

19. The method of claim 18 further comprising adding data related to an interval between the transmitted messages into the transmitted messages.

20. The method of claim 18 wherein transmitting the messages at intervals further comprises transmitting the messages at intervals wherein the intervals of transmission comprises at least one of one or more periods of a window clock, the window clock being derived from the transmit clock and synchronized to the transmit clock.

21. The method of claim 20 wherein the window clock period is programmable and the programmable period is transmitted as part of the message data.

22. The method of claim 18 wherein transmitting the messages at intervals further comprises transmitting the messages at intervals that are fixed and wherein a Clear Channel Assessment (CCA) process is done on a first channel.

23. The method of claim 18 wherein the transmitted messages are transmitted in a variable order of channels.

24. The method of claim 23 wherein said transmitted messages include information regarding a next channel to be used.

25. The method of claim 18 wherein the transmitted messages are transmitted as a response to an external request or event.

26. The method of claim 18 wherein said transmitted messages are transmitted within time slots as specified by a WLAN Access Point or any other element managing traffic in the wireless network.

27. The method of claim 18 further comprising estimating, by at least one of the plurality of location receivers, a transmitter clock frequency.

28. The method of claim 27 further comprising reporting, by at least one of the plurality of location receivers, the estimated clock frequency of said wireless unit to a master unit for use in improving the TDOA accuracy.

29. A wireless unit for synchronously transmitting messages in multiple channels of a wireless data communication system that is configured to locate the wireless unit, the wireless unit comprising:
a communication controller which generates data to be transmitted; and
a transmitter coupled to the communication controller to modulate the data and transmit the messages in a programmed channel of multiple channels of the data communication system to location receivers that provide time of arrival data relating to the messages used to determine the location of the wireless unit by a Time Difference Of Arrival (TDOA) of the transmitted messages, the transmitter starting transmission of the messages at intervals consisting of at least one of one or more periods of a transmit clock signal so that transmission of two of the messages is separated by a time interval of one or more periods of the transmit clock signal, wherein the transmitter does not transmit during the time interval.

30. A wireless unit that synchronously transmits messages in multiple channels of a multiple channel wireless data communication system including wireless units that communicate with one or more location receivers, wherein the wireless communication system is configured to locate the wireless unit, the wireless unit comprising:
   a communication controller that generates data to be transmitted; and
   a transmitter coupled to the communication controller to modulate the data and transmit the messages in a programmed channel, the transmitter starting transmission of the messages at intervals consisting of at least one of one or multiple periods of a transmit clock signal,
   wherein the wireless unit further comprises a counter coupled to the communication controller to count cycles of the transmit clock signal, and
   wherein the communication controller clears and enables the counter to start counting when transmission of a first signal starts, the communication controller samples and reads a counter value when transmission of a second signal on a different channel starts, and the counter continuing counting clock cycles.

31. A wireless unit as specified in claim 29 further comprising a timing circuit coupled to the transmitter to provide synchronization of the transmit signals.

32. A wireless unit that synchronously transmits messages in multiple channels of a multiple channel wireless data communication system including wireless units that communicate with one or more location receivers, the wireless communication system configured to locate the wireless unit, the wireless unit comprising:
   a communication controller that generates data to be transmitted;
   a transmitter coupled to the communication controller to modulate the data and transmit the messages in a programmed channel, the transmitter starting transmission of the messages at intervals consisting of at least one of one or multiple periods of a transmit clock signal; and
   a timing circuit coupled to the transmitter to provide synchronization of the transmit signals, the timing circuit comprising:
      a clock divider coupled to the transmit clock signal for generating a window clock signal, wherein the window clock signal and the transmit clock signal are synchronized, and
      a flip-flop device coupled to the communication controller, the flip flop device receiving start and stop transmission signals and outputting the synchronized start transmission signal on an edge of the window clock.

33. A wireless network comprising:
   a wireless unit that synchronously transmits messages in multiple channels using a transmit clock signal, the wireless unit starting transmission of the messages at intervals comprising of at least one of one or multiple periods of the transmit clock signal, wherein the wireless unit comprises a communication controller that generates data to be transmitted and a counter coupled to the communication controller to count cycles of the transmit clock signal, wherein the communication controller clears and enables the counter to start counting when transmission of a first message begins and samples and reads a counter value when transmission of a second message on a different channel begins, and the counter continuously counts clock cycles;
   a plurality of location receivers for receiving the messages in one of at least two different channels, said messages transmitted by the wireless unit within the wireless network and determining a time of arrival for the received messages; and
   at least one master unit for receiving the time of arrival from each of the location receivers, whereby a location of the wireless unit is determined based on a Time Difference Of Arrival (TDOA) of the transmitted messages at the location receivers.

34. A method for synchronously transmitting messages at different channels in a multiple-channel wireless data communication system configured to determine the location of a wireless unit, comprising:
   transmitting a first message by the wireless unit to a first location receiver that determines a first time of arrival data for the first message that is used by a master unit, wherein transmitting the first message includes:
      clearing and enabling a counter that counts cycles of a transmit clock signal to start counting when transmission of the first message begins; and
   transmitting a second message on a different channel by the wireless unit to a second location receiver that determines a second time of arrival data for the second message that is used by the master unit to determine a location of the wireless unit based on a Time Difference Of Arrival (TDOA) of the transmitted first and second messages, wherein transmitting the second message includes:
      sampling and reading a counter value when transmission of the second message on the different channel begins while the counter continues to count clock cycles,
   wherein the first and second messages are synchronized using the transmit clock signal and the first and second messages are transmitted at intervals comprising of at least one of one or multiple periods of the transmit clock signal.

35. A system for determining the Time Difference Of Arrival (TDOA) of messages transmitted at different channels in a multiple-channel wireless data communication system comprising:
   a receiving component that receives first time of arrival information from a first location receiver and second time of arrival information from a second location receiver, wherein the first time of arrival information corresponds to a first message transmitted by a wireless unit over a first channel to the first location receiver and the second time of arrival information corresponds to a second message transmitted by the wireless unit over a second channel to the second location receiver, wherein the wireless unit starts transmission of the first and second messages at intervals including at least one of one or more periods of a transmit clock signal so that transmission of the first and second messages is separated by a time interval of one or more periods of the transmit clock signal, and wherein the wireless unit does not transmit during the time interval; and
   a processing component that determines, based on the first and second time of arrival information, the TDOA of the first and second messages at the first and second location receivers.

* * * * *

UNITED STATES PATENT AND TRADEMARK OFFICE
CERTIFICATE OF CORRECTION

| | | |
|---|---|---|
| PATENT NO. | : 8,576,829 B2 | Page 1 of 1 |
| APPLICATION NO. | : 11/835553 | |
| DATED | : November 5, 2013 | |
| INVENTOR(S) | : Daniel Aljadeff et al. | |

It is certified that error appears in the above-identified patent and that said Letters Patent is hereby corrected as shown below:

In the Claims

Claim 2, col. 8, line 61, "with claim wherein" should read -- with claim 1 wherein --.

Signed and Sealed this
Fourth Day of March, 2014

Michelle K. Lee
*Deputy Director of the United States Patent and Trademark Office*